(12) United States Patent
Shah et al.

(10) Patent No.: US 7,298,775 B1
(45) Date of Patent: Nov. 20, 2007

(54) PROCESSOR-IMPLEMENTED RAKE RECEIVER

(75) Inventors: Tushar Shah, Milpitas, CA (US); Manouchehr Rafie, Sunnyvale, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 805 days.

(21) Appl. No.: 10/651,827

(22) Filed: Aug. 29, 2003

(51) Int. Cl.
*H04B 1/00* (2006.01)

(52) U.S. Cl. .................................................. 375/147

(58) Field of Classification Search ................ 375/147; 712/22
See application file for complete search history.

(56) References Cited

U.S. PATENT DOCUMENTS

| 5,764,687 | A  | * | 6/1998  | Easton ........................ 375/147 |
| 6,650,694 | B1 | * | 11/2003 | Brown et al. ................ 375/150 |
| 6,788,731 | B2 | * | 9/2004  | Kim et al. ................... 375/142 |
| 7,065,128 | B2 | * | 6/2006  | Medlock et al. ............. 375/147 |

* cited by examiner

*Primary Examiner*—Temesghen Ghebretinsae
*Assistant Examiner*—Juan Alberto Torres
(74) *Attorney, Agent, or Firm*—Merchant & Gould PC

(57) ABSTRACT

A SWP- (Sub-Word Parallelism-) based RAKE receiver for a Wideband Code-Division Multiple Access (WCDMA) mobile station is optimized to perform channel de-rotation and data combining. The RAKE receiver comprises SIMD (Single Instruction, Multiple Data) instructions, which can perform a complex multiplication for a channel de-rotation in a single cycle. The SIMD instructions can also perform a complex addition for data combining in a single cycle. Optimization of the RAKE receiver reduces power consumption and costs, enhances performance, and provides extensibility for next-generation architectures.

19 Claims, 6 Drawing Sheets

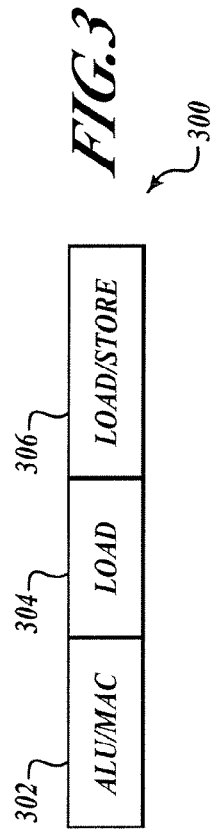

FIG. 3

| ALU/MAC | LOAD | LOAD/STORE |
|---|---|---|
| 302 | 304 | 306 |

| Multiply, Multiply-accumulate | $r0 = op1 * op2$<br>$acc0 += op1 * op2$ |
|---|---|
| Add or Subtract | $r0 = op1 + op2, r0 = op1 - op2$ |
| Various logical operations | $r0 = op1\ (\&, |, \wedge)\ op2$ |
| Load, Store | load, store |
| Parallel load | Pload |
| Zero overhead loop | loop N |
| Conditional | if ($r0 = 0$) |
| SWP/SIMD for complex multiply, parallel multiplies, parallel add/sub | emul, pmul4, pmul, padd, psub |
| Viterbi decoder | ACS, Traceback |
| Turbo decoder | $T_{max}$ |

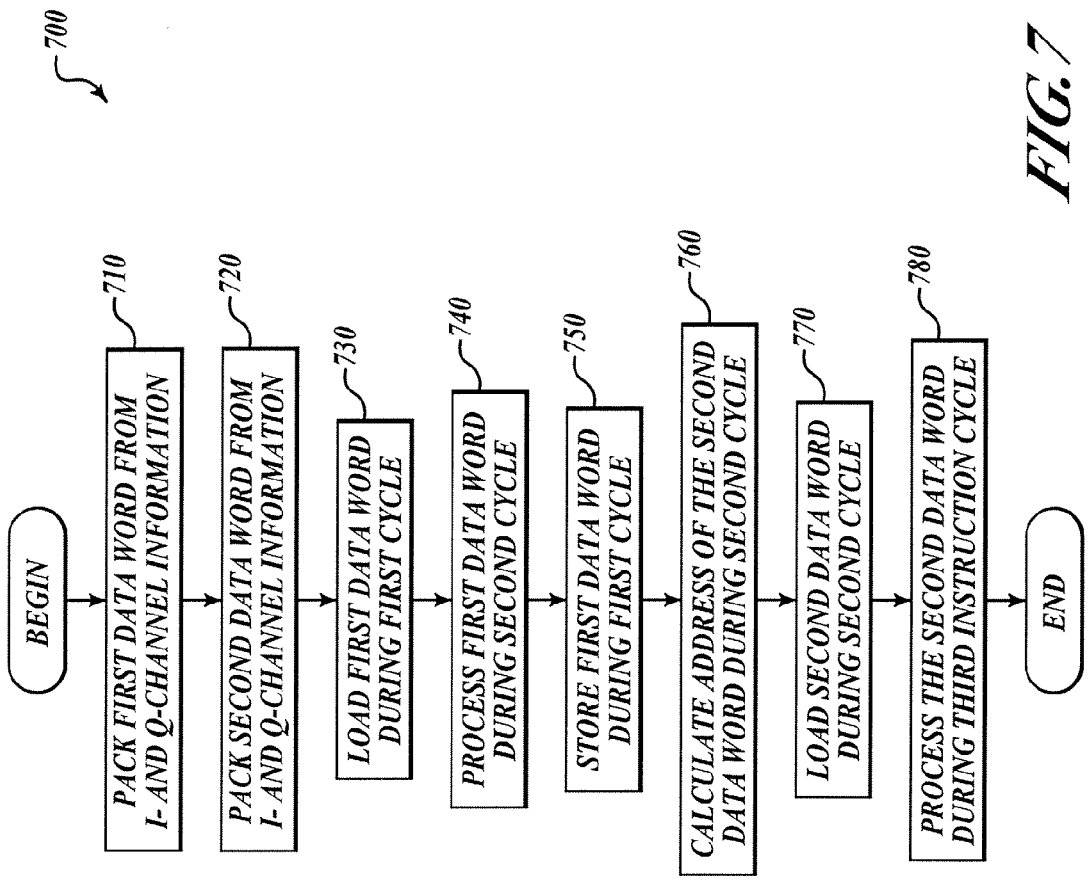

PROCESSOR-IMPLEMENTED RAKE RECEIVER

FIELD OF THE INVENTION

The present invention relates to wideband code-division multiple access (WCDMA) systems, and more particularly to a communication signal processor (CSP) architecture that is optimized for WCDMA systems.

BACKGROUND OF THE INVENTION

Code division multiple access (CDMA) is used in communications systems to accommodate large numbers of system users. CDMA uses a spread spectrum modulation technique, where the signal energy of each channel is spread over a wide frequency band.

WCDMA is a third-generation mobile wireless technology that is based on an ITU standard derived from CDMA technology. WCDMA can support mobile/portable voice, images, data, and video communications at up to 2 Mbps (local area access) or 384 kbps (wide area access). The supported data is converted into a digital signal that is spread spectrum coded for transmission and reception over multiple frequencies.

An appreciation of the present invention and its improvements can be obtained by reference to the accompanying drawings that are briefly summarized below, to the following detailed description of illustrated embodiments of the invention, and to the appended claims.

BRIEF DESCRIPTION OF THE DRAWINGS

Non-limiting and non-exhaustive embodiments of the present invention are described with reference to the following drawings.

FIG. 3 illustrates an example instruction word for a CSP in accordance with aspects of the present invention.

FIG. 4 illustrates examples of instructions used in example CSPs in accordance with aspects of the present invention.

FIG. 7 is a flow diagram illustrating a method for implementing a rake receiver.

DETAILED DESCRIPTION OF THE PREFERRED EMBODIMENT

Figure 1:
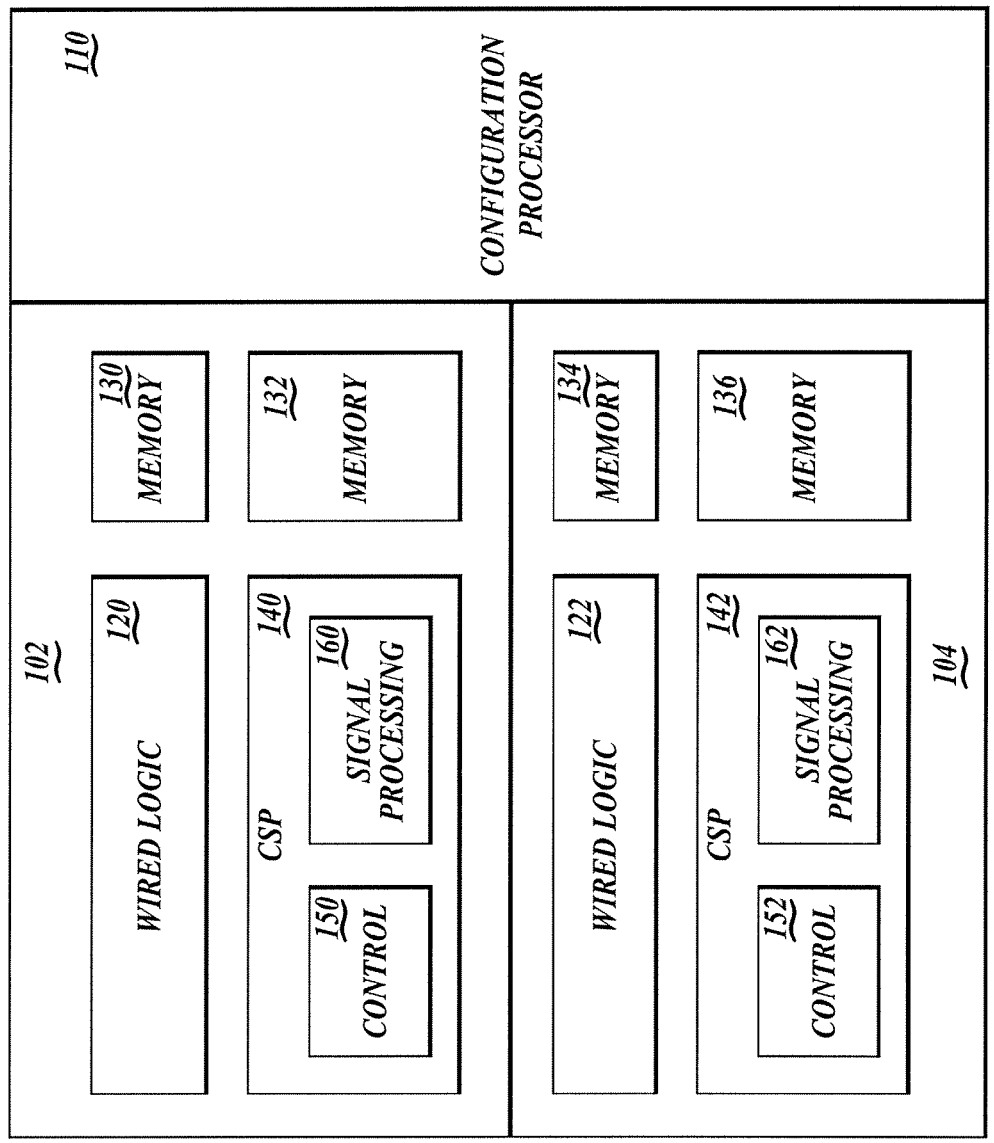
FIG. 1 illustrates an example system having a communication signal processor architecture in accordance with aspects of the present invention.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context clearly dictates otherwise. The meanings identified below are not intended to limit the terms, but merely provide illustrative examples for the terms. The meaning of "a," "an," and "the" includes plural reference, the meaning of "in" includes "in" and "on." The term "connected" means a direct electrical connection between the items connected, without any intermediate devices. The term "coupled" means either a direct electrical connection between the items connected, or an indirect connection through one or more passive or active intermediary devices. The term "circuit" means either a single component or a multiplicity of components, either active and/or passive, that are coupled together to provide a desired function. The term "signal" means at least one current, voltage, charge, temperature, data, or other signal.

Briefly stated, the invention is related to an SWP- (Sub-Word Parallelism-) based RAKE receiver for a WCDMA mobile station that is optimized to perform channel de-rotation and data combining. The RAKE receiver comprises SIMD (Single Instruction, Multiple Data) instructions, which can perform a complex multiplication for a channel de-rotation in a single cycle. The SIMD instructions can also perform a complex addition for data combining in a single cycle. Optimization of the RAKE receiver reduces power consumption and costs, enhances performance, and provides extensibility for next-generation architectures.

FIG. 1 illustrates an example system (100) having a CSP architecture that is arranged in accordance with aspects of the present invention. System 100 includes a first processing block (102), a second processing block (104) and a configuration processor block (110). Processing block 102 includes a first wired logic block (120), a first CSP engine (140), a first memory circuit (130), and a second memory circuit (132). Processing block 104 includes a second wired logic block (122), a second CSP engine (142), a third memory circuit (134), and a fourth memory circuit (136). CSP engine 140 includes a first control block (150) and a first signal processing block (160). CSP engine 142 includes a second control block (152) and a second signal processing block (162).

System 100 is configured to perform a system function comprising a first function and a second function. The first and second function each comprise modular functions. According to one example embodiment, the system function is related to WCDMA, where the first function corresponds to a RAKE receiver function, and the second function corresponds to a cell search function. Processing block 102 is configured to perform the first function. Wired logic block 120 is arranged to perform fixed modular functions for which algorithmic changes of the first function are not contemplated. For example, the despreading modular function is typically fixed and can be implemented as "wired" logic, which usually does not provide flexibility for programmable changes.

Control block 150 comprises control hardware and an associated datapath. For example, control block 150 typically includes a sequencer, an instruction decoder, and other configuration and control logic. Control block 150 is typically similar to other control blocks (e.g. 152). Signal processing block 160 comprises signal processing hardware and an associated data path. Signal processing block 160 is configured to perform the modular functions of the first function that might require flexibility for algorithmic changes. For example, the channel estimation modular function typically requires flexibility for changing the algorithm.

According to one example, CSP engine 140 is structured such that control block 150 and signal processing block 160 are separate.

The design of CSP engine 140 is optimized for accomplishing the first function. According to one example, CSP engine 140 is based on a customizable signal processor. Signal processing block 160 is arranged to perform a first algorithm for the first function (which is associated with the RAKE receiver function). The first algorithm is optimized for performing the first function. Signal processing block 160 includes standard modules (such as arithmetic logic units, multiply-accumulate modules, and the like) and custom modules. The custom modules for signal processing block 160 are configured for substantially optimizing the first function. The hardware of signal processing block 160 can be optimized for performing operations of the first algorithm. For example, the hardware of signal processing block 160 typically includes hardware that is configured to perform, in parallel, multiple operations of the first algorithm.

The memory architecture of processing block 102 is optimized for performance of the first function. Memory 130 and memory 132 are independently addressable such that parallel read/write operations are supported.

Processing block 102 operates in accordance with a set of instruction words that is usually independent of any other element of system 100. The set of instructions words for processing block 102 includes at least one instruction word that is optimized for performing the first functions. For example, one or more instruction words can be configured to support the simultaneous execution of multiple instructions. According to one example, one or more instructions are arranged for sub-word parallelism (SWP) and single instruction, multiple data (SIMD) instructions. The substantial optimization of instruction words is described in greater detail with reference to FIG. 3 below.

The instruction set for processing block 102 is optimized for performing the first function. The instructions for the instruction set for processing block 102 are selected such that the first algorithm can be efficiently performed.

Processing block 104 is substantially similar to processing block 102, except that processing block 104 can be optimized for performance of the second function. Control block 152 can be substantially identical in form to block 150. Signal processing block 162 is generally optimized to perform the second function. The memory architecture, instruction set, and instructions words for processing block 104 are each typically optimized for performance of the second function.

Configuration processor block 110 is arranged for configuration and maintenance of each of the processing blocks (e.g. 102 and 104). According to one example, configuration processor block 110 is an ARM (Advanced Reduced instruction-set computer Machine) CPU (central processing unit). Configuration processing block 110 can perform other tasks as well.

Figure 2:
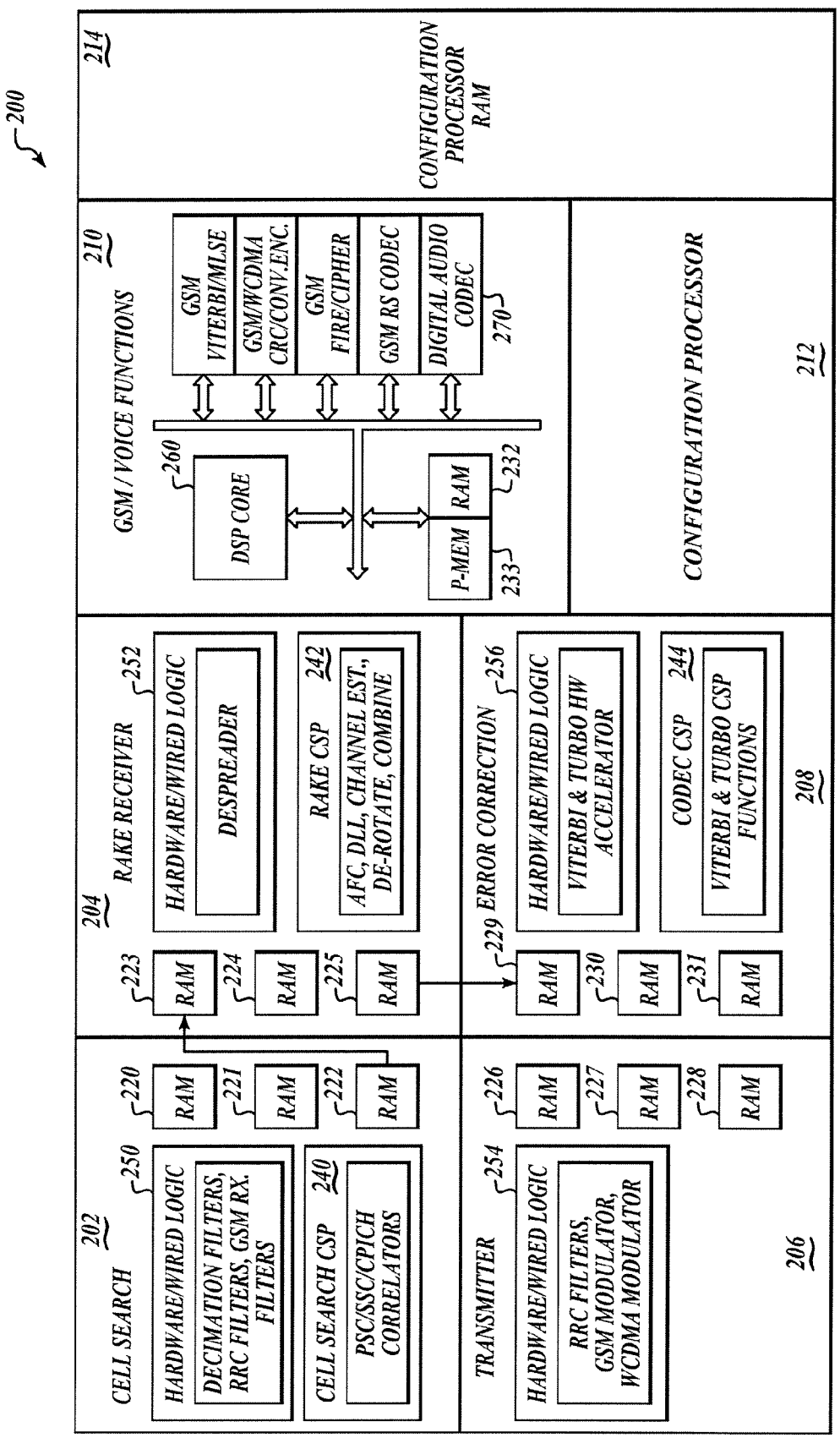
FIG. 2 illustrates a WCDMA baseband system in accordance with aspects of the present invention.

FIG. 2 is an illustration an example embodiment of a WCDMA baseband system (200) that is arranged in accordance with aspects of the present invention. System 200 comprises a cell search block (202), a RAKE receiver block (204), a transmitter block (206), an error correction block (208), a global system for mobile communications (GSM)/voice functions block (210), a configuration processor block (212), and a configuration processor memory (214). Cell search block 202 comprises memories (220-222), a cell search CSP engine (240), and a wired logic circuit (250). RAKE receiver block 204 comprises memories (223-225), a RAKE CSP engine (242), and a wired logic circuit (252). Transmitter block 206 comprises memories (226-228) and a wired logic circuit (254). Error correction block 208 comprises memories (229-231), a codec CSP engine (244), and a wired logic circuit (256). GSM/voice functions block 210 comprises a memory (232), a programmable memory block (233), a digital signal processing (DSP) core (260), and a GSM block (270). (More than one engine can be used for a particular block, which allows enhanced performance and extensibility to next-generation architectures.) RAKE receiver block 204 is configured to perform a RAKE receiver function. The RAKE receiver function comprises several modular functions such as a despreading function, a delay-lock loop (DLL) function, a channel estimation function, a de-rotation function, an automatic frequency control (AFC) function, a signal-to-interference (SIR) function, and a combining function. Wired logic block 252 is typically configured to perform the despreading function. RAKE CSP engine 242 is typically configured to perform the DLL function, the channel estimation function, the de-rotation function, the AFC function, the SIR function, Doppler estimation, and the combining function.

The memory architecture of the RAKE receiver block (204) is optimized for the RAKE receiver function. According to one example, the memory architecture for RAKE receiver processing block 204 comprises distributed memory banks for each of a plurality of fingers, odd and even banks for each finger, multiple address pointers for different types of data, and multiple memory banks that are configured for multiple channel estimations. Different data types include pilot symbols, power control symbols, transport format indicators, and user data.

RAKE CSP engine 242 is configured to perform a RAKE receiver signal processing algorithm. The RAKE receiver signal processing algorithm is optimized for performing the RAKE receiver function. The hardware of RAKE CSP engine 242 is optimized for performing the RAKE receiver signal processing algorithm. The algorithm is implemented with a set of instruction words that is optimized for the RAKE receiver function. The set of instruction words includes instructions that are optimized for the RAKE receiver function.

RAKE CSP engine 242 includes instruction words that allow the parallel execution of multiple operations of the RAKE receiver signal processing algorithm. The hardware architecture of RAKE CSP engine 242 comprises hardware blocks that can operate simultaneously to support the multiple parallel operations. Instruction words and hardware architecture support multiple parallel operations, which reduces instruction fetching, instruction decoding, and memory accesses such that power consumption is reduced. According to one example, the architecture of RAKE CSP engine 242 is arranged to support two multiplication-accumulators (MACs) with SWP and SIMD instructions. An example of an instruction word (300) for RAKE CSP engine 242 is illustrated in FIG. 3.

FIG. 3 illustrates an example instruction word (300) for an example CSP. Instruction 300 includes three fields (302, 304, and 306). Field 302 corresponds to ALU/MAC, field 304 corresponds to Load, and field 306 corresponds to Load/Store. Instruction 300 is an example of an instruction word that is arranged to support multiple operations in parallel. Instruction 300 is arranged to support parallel execution of ALU/MAC, Load, and Load/Store instructions. RAKE receiver algorithms require frequent use of multiplication, load, and load/store instructions. Instruction 300 and the supporting architecture allow functions such as multiplication, multiply-accumulate, addition, load, and load/store to be performed simultaneously.

Different modular functions can be implemented with different levels of precision. According to one example, the channel estimation function uses 16 bits per operand, and the de-rotation function uses 8 bits per operand. A 16-bit multiplier can be configured as four 8-bit multipliers such that a SIMD instruction comprising four 8-bit operands can perform a complex multiplication in 1-2 cycles. A 16-bit multiplier can take 8-10 cycles total to complete complex multiply instructions for the four 8-bit operands. Data is loaded in parallel such that all four multiplications are done in parallel. Power consumption is also significantly reduced using a SIMD instruction (and four 8-bit multipliers) to implement the de-rotation function.

Each of the CSP engines (240, 242, and 244) have an instruction set that is optimized for the signal processing function that it is configured to perform. FIG. 4 illustrates a few examples of instructions used in instructions sets of example CSPs, in accordance with aspects of the present invention. The instruction set of RAKE CSP engine 242 comprises instructions such as SWP and SIMD instructions to complex multiply, parallel multiply, parallel add, and parallel subtract. Codec CSP 206 includes instructions such as "add-compare-select" (ACS), "traceback" for a Viterbi decoding, and $T_{max}$ for a Turbo decoder. Each of the CSP engines comprises approximately 10,000 logic gates, which provides a substantial reduction in the number of logic gates required for conventional DSP cores.

Each of the other processing blocks (e.g. 202, 206, 208, and 210) are also optimized for the function that the block is configured to perform. The control hardware and associated datapath of each of the processing blocks is similar. For example, cell search CSP engine 202 has an architecture and instruction words that are optimized for a cell search algorithm. Cell search processing block 202 includes a memory architecture that is optimized for the cell search algorithm. Cell search processing block 202 includes data memory 220, which is independently addressable from data memory 221 such that read and write operations of these memories can be performed simultaneously.

Each of the CSP engines (e.g. 240, 242, and 244) provides flexibility for changes in the algorithm. For example, the algorithm for a CSP algorithm can be changed based on experimentation or changes to the 3GPP standards. Additionally, the algorithm can be modified to support future generations of high data rate systems.

Each of the processing blocks (e.g. 202, 204, 206, 208, and 210) is typically configured to run independently. Each of the processing blocks is responsive to interrupt signals, where the interrupt signal can be provided by another processing block or configuration processor 212. Data can be sent to another processing block or to configuration process 212 when the processing block has received an interrupt. Alternatively, date can be received from the other processing block or configuration processor 212 when the processing block has received an interrupt.

Configuration processor 212 is arranged for configuration and maintenance of the processing blocks (202, 204, 206, 208, and 210). For example, configuration processor 212 is arranged to provide configuration with regard to slot formats that define the services. Configuration processor memory 214 is arranged as the memory for configuration processor 212.

Figure 5:
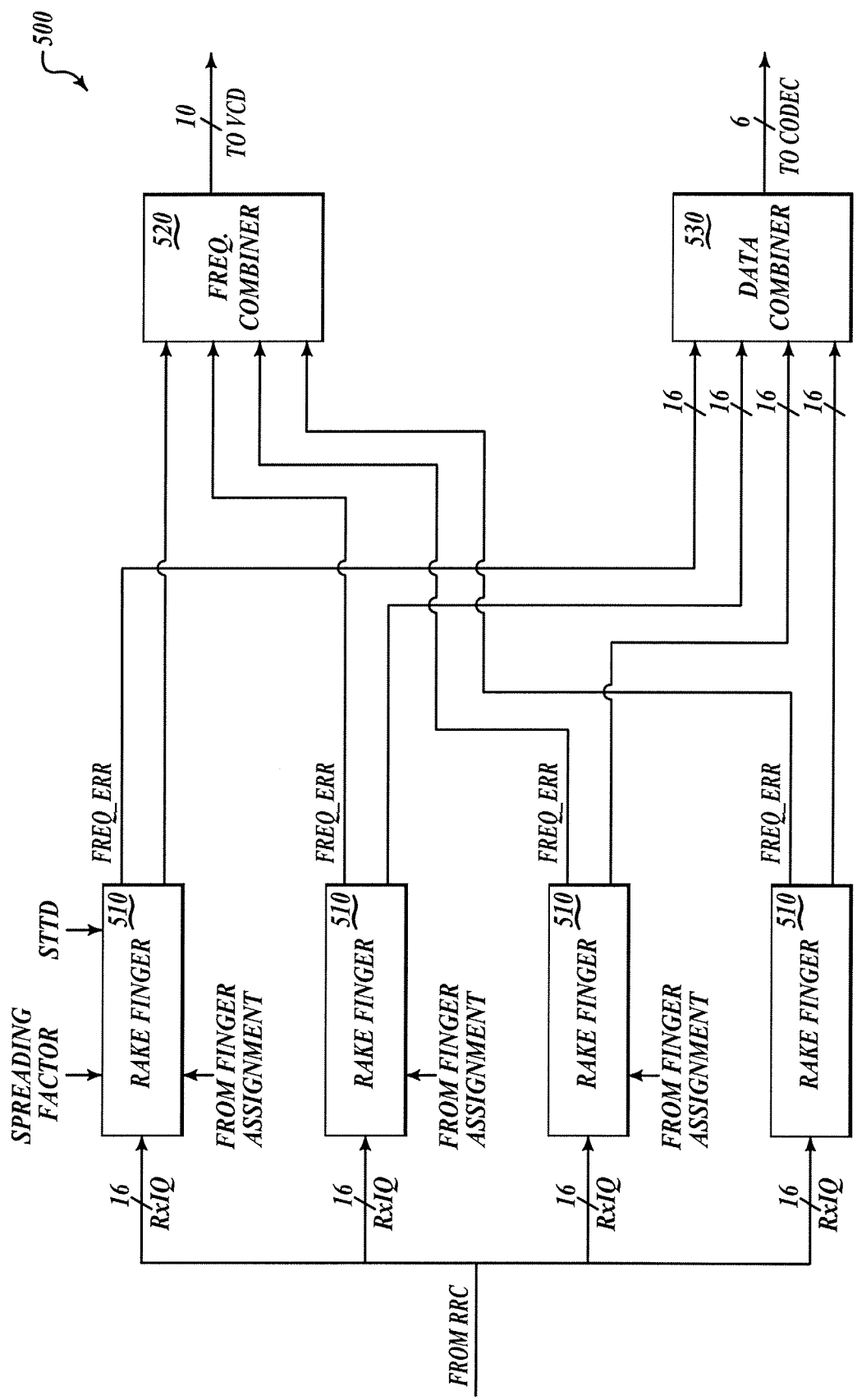
FIG. 5 is a block diagram of a RAKE receiver in accordance with an aspect of the present invention.

FIG. 5 is a block diagram of a RAKE receiver in accordance with an aspect of the present invention. RAKE receiver 500 comprises RAKE fingers 510, frequency combiner 520, and data combiner 530. RAKE fingers 510 provide data across a 16-bit wide datapath, frequency combiner 520 provides data across a 10-bit wide datapath, and data combiner 530 provides data across a 6-bit wide datapath. RAKE receiver 500 typically comprises six RAKE fingers 510, although more or less can be used.

RAKE receiver 500 can be optimized by matching the widths of the datapaths and by tailoring instructions to efficiently implement the RAKE receiver 500 functionality. For example, the instructions used to implement data combiner 530 can be optimized by using 8-bit wide operands to handle data where 6-bit precision is desired.

Figure 6:
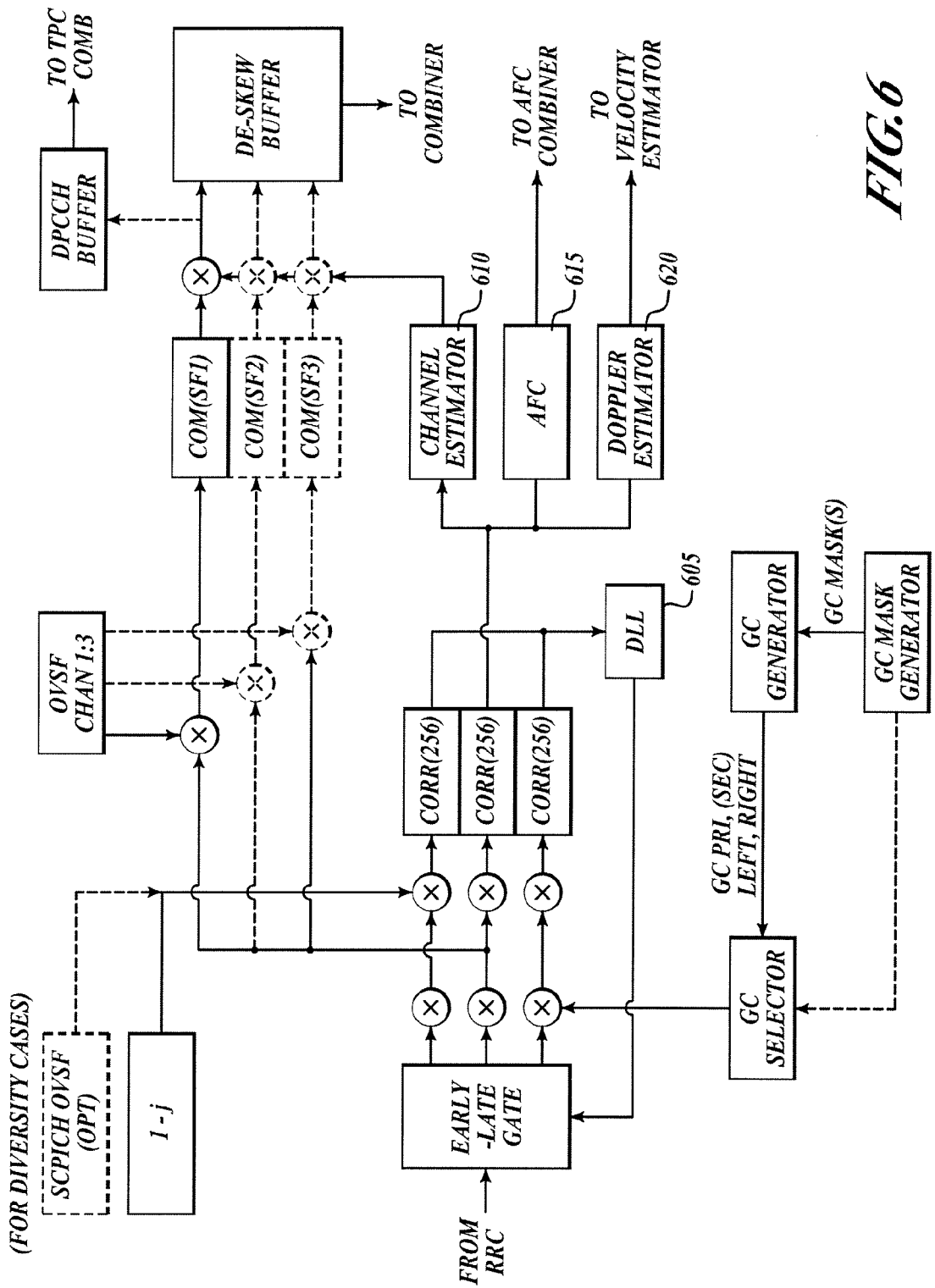
FIG. 6 is a block diagram of an example RAKE finger of a RAKE receiver in accordance with an aspect of the present invention.

FIG. 6 is a block diagram of an example RAKE finger of a RAKE receiver in accordance with an aspect of the present invention. Some of the blocks within the RAKE receiver (such as DLL 605, channel estimator 610, automatic frequency control 615, and Doppler estimator 620) often require 16-bit precision, which is already optimal for a 16-bit wide datapath.

Simulation of an example RAKE receiver 500 has shown that around 70 percent of the required processing power (at a data rate of 384 kbps) is consumed on the channel de-rotation and data combination functions. Channel de-rotation block (see RAKE receiver 242) comprises a complex multiply operation and data combiner 530 comprises a complex addition. Accordingly, large gains in efficiency can be realized by optimizing the channel de-rotation and data combination functions.

As an example of sub-word parallelism, a 16-bit datapath can be partitioned into two 8-bit datapaths in order to implement the channel de-rotation and data combination functions. An 8-bit data path is used for I-channel and Q-channel data, respectively, such that an I-channel symbol and a Q-channel symbol are packed into a 16-bit word and an I-channel estimate and a Q-channel estimate are packed into a second 16-bit word. This packing of 8-bit I- and Q-channel symbols and channel estimates reduces the amount of memory that would otherwise be required in RAKE receiver 500. The packing also reduces the number of memory accesses that would otherwise be required. Accordingly, the packing reduces power consumption and costs, and increases speed.

As described above with reference to FIG. 3, SIMD instructions can be used to optimize the RAKE receiver. A SIMD instruction word can be load two 16-bit packed data words in a single cycle. The loading of data symbols and channel estimate can be done in a single cycle if the data symbols and channel estimates are stored in separate memory banks (as in, for example, memory 130 and memory 132).

Additionally, an instruction word that supports ALU/MAC instructions in parallel to a load instruction such that the ALU/MAC hardware is working on a complex multiply for the channel de-rotation while the Address Generation Unit (AGU) is simultaneously working on loading data for the next complex multiply (of the ALU/MAC) from the data symbol and channel estimate memory banks.

Accordingly, a complete channel de-rotation operation of RAKE receiver 500 using a SWP-based CSP architecture can use one or two clock cycles to perform the entire de-rotation. (The entire de-rotation involves loading data from memory, executing a complex multiply instruction, and storing the results back in memory.) In contrast, a conventional processor requires 8-10 clock cycles due to inefficient use of the data paths (e.g., by using only a portion of the available bandwidth) and due to having to execute individual "load," "multiply," and "store" instructions sequentially.

FIG. 7 is a flow diagram illustrating a method for implementing a rake receiver. Flow 700 can begin with operation 710. Operation 710 comprises packing a first I-channel estimate, a first I-channel symbol, a first Q-channel estimate, and a first Q-channel symbol into a first data word stored in memory. Operation 720 comprises packing a second I-channel estimate, a second I-channel symbol, a second Q-channel estimate, and a second Q-channel symbol into a second data word stored in memory. Operation 730 comprises loading the first data word from memory during a first instruction cycle of a processor. Operation 740 comprises arithmetically processing the loaded first data word during a second instruction cycle that immediately follows the first instruction cycle. Operation 750 comprises storing the processed first data word in memory during the second instruction cycle. Operation 760 comprises calculating the address of the second data word in the second instruction cycle. Operation 770 comprises loading the second data word from memory during the second instruction cycle. Operation 780 comprises arithmetically processing the loaded second data word during a third instruction cycle that immediately follows the second instruction cycle.

Various embodiments of the invention are possible without departing from the spirit and scope of the invention. For example, SWP SIMD instructions can be used in data combiner 530. Data combiner 530 can be implemented using instructions having packed data operands and a simultaneous complex add and address calculation as described above. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for implementing a RAKE receiver, comprising:
   packing a first I-channel estimate, a first I-channel symbol, a first Q-channel estimate, and a first Q-channel symbol into a first data word stored in memory;
   packing a second I-channel estimate, a second I-channel symbol, a second Q-channel estimate, and a second Q-channel symbol into a second data word stored in memory;
   loading the first data word from memory during a first instruction cycle of a processor;
   arithmetically processing the loaded first data word during a second instruction cycle that immediately follows the first instruction cycle;
   storing the processed first data word in memory during the second instruction cycle;
   calculating the address of the second data word in the second instruction cycle;
   loading the second data word from memory during the second instruction cycle; and
   arithmetically processing the loaded second data word during a third instruction cycle that immediately follows the second instruction cycle.

2. The method of claim 1, wherein the arithmetically processing comprises a complex multiplication.

3. The method of claim 2, wherein the complex multiplication performs a channel de-rotation.

4. The method of claim 1, wherein the arithmetically processing comprises a complex addition.

5. The method of claim 4, wherein the complex addition combines data from a plurality of fingers of the RAKE receiver.

6. The method of claim 5, wherein the complex addition is produced with a precision of 6-bit accuracy.

7. The method of claim 1, wherein the estimates and symbols are stored in different memories.

8. The method of claim 1, wherein the packing, loading, arithmetically processing, storing, and calculating are performed using distributed processing engines.

9. A RAKE receiver, comprising:
   means for in memory a first data word comprising a first I-channel estimate, a first I-channel symbol, a first Q-channel estimate, and a first Q-channel symbol;
   means for storing in memory a second data word comprising a second I-channel estimate, a second I-channel symbol, a second Q-channel estimate, and a second Q-channel symbol into a second data word stored in memory;
   means for loading the first data word from memory during a first instruction cycle of a processor;
   means for arithmetically processing the loaded first data word during a second instruction cycle that immediately follows the first instruction cycle;
   means for storing the processed first data word in memory during the second instruction cycle;
   means for calculating the address of the second data word in the second instruction cycle;
   means for loading the second data word from memory during the second instruction cycle; and
   means for arithmetically processing the loaded second data word during a third instruction cycle that immediately follows the second instruction cycle.

10. The receiver of claim 9, wherein the arithmetically processing comprises a complex multiplication.

11. The receiver of claim 10, wherein the complex multiplication performs a channel de-rotation.

12. The receiver of claim 9, wherein the arithmetically processing comprises a complex addition.

13. The receiver of claim 12, wherein the complex addition combines data from a plurality of fingers of the RAKE receiver.

14. The receiver of claim 13, wherein the complex addition is produced with a precision of 6-bit accuracy.

15. The receiver of claim 14, wherein the estimates and symbols are stored in different memory banks.

16. A RAKE receiver, comprising:
   a despreader, and
   plurality of processing multiply-accumulators (MACs) that comprise SWP (sub-word parallelism) and SIMD (single instruction-multiple data) instructions, wherein the MACs collectively perform:
      packing a first I-channel estimate, a first I-channel symbol, a first Q-channel estimate, and a first Q-channel symbol into a first data word stored in memory;
      packing a second I-channel estimate, a second I-channel symbol, a second Q-channel estimate, and a second Q-channel symbol into a second data word stored in memory;
      loading the first data word from memory during a first instruction cycle of a processor;
      arithmetically processing the loaded first data word during a second instruction cycle that immediately follows the first instruction cycle;
      storing the processed first data word in memory during the second instruction cycle;
      calculating the address of the second data word in the second instruction cycle;

loading the second data word from memory during the second instruction cycle; and arithmetically processing the loaded second data word during a third instruction cycle that immediately follows the second instruction cycle.

17. The receiver of claim 16, wherein at least one of the MACs further configured to perform a cell search function.

18. The receiver of claim 17, wherein the estimates and symbols are stored in different memories.

19. The receiver of claim 16, wherein one of the MACs comprises an instruction set containing at least one instruction word that when executed initiates:

arithmetically processing the loaded first data word during the second instruction cycle that immediately follows the first instruction cycle;

storing the processed first data word in memory during the second instruction cycle;

calculating the address of the second data word in the second instruction cycle; and loading the second data word from memory during the second instruction cycle.

* * * * *